(12) United States Patent
Mazzarella et al.

(10) Patent No.: US 10,862,932 B2
(45) Date of Patent: Dec. 8, 2020

(54) IMPLEMENTING PUSH-TO-TALK IN A MULTIMEDIA CONFERENCING SYSTEM

(71) Applicant: Mutualink, Inc., Wallingford, CT (US)

(72) Inventors: Joseph Mazzarella, Tolland, CT (US); Derrell Lipman, Billerica, MA (US); Anand Setlur, Wallingford, CT (US); Michael Wengrovitz, Concord, MA (US)

(73) Assignee: Mutualink, Inc., Wallingford, CT (US)

( * ) Notice: Subject to any disclaimer, the term of this patent is extended or adjusted under 35 U.S.C. 154(b) by 0 days.

(21) Appl. No.: 15/913,121

(22) Filed: Mar. 6, 2018

(65) Prior Publication Data
US 2019/0281096 A1  Sep. 12, 2019

(51) Int. Cl.
*H04N 7/15* (2006.01)
*H04L 29/06* (2006.01)

(52) U.S. Cl.
CPC ...... *H04L 65/4061* (2013.01); *H04L 65/1069* (2013.01); *H04L 65/403* (2013.01); *H04N 7/152* (2013.01)

(58) Field of Classification Search
USPC ..................................................... 348/14.02
See application file for complete search history.

(56) References Cited

U.S. PATENT DOCUMENTS 7,991,419 B2   8/2011  Matsumoto et al.
8,406,798 B2   3/2013  Mao et al.
9,071,943 B2   6/2015  Mo
9,781,582 B2  10/2017  He et al.
2006/0229093 A1* 10/2006  Bhutiani ................. H04W 4/10
                                                       455/518

(Continued)

FOREIGN PATENT DOCUMENTS

WO   WO 2014/077743 A1   5/2014
WO   WO 2016/029476 A1   3/2016

(Continued)

OTHER PUBLICATIONS

NENA/APCO Next Generation 9-1-1 PSAP Requirement NENA/APCO-REQ-001.1.2-2018, Apr. 5, 2018 (https://www.nena.org/resource/resmgr/standards/NENA-APCO-REQ-001.1.2018_N.pdf); 63 pages.

(Continued)

*Primary Examiner* — Amal S Zenati
(74) *Attorney, Agent, or Firm* — Sterne, Kessler, Goldstein & Fox P.L.L.C.

(57) ABSTRACT

Systems and methods of providing push-to-talk communication techniques in a multimedia conferencing session are provided. For instance, a push-to-talk mode can be implemented in a conferencing session associated with a conferencing system comprising a plurality of endpoints. At least one of the endpoints can be a full duplex endpoint. A request for transmission capabilities can be received from a first endpoint. Transmission capabilities can be granted to the first endpoint based at least in part on one or more floor control parameters associated with the conferencing session. Subsequent to granting transmission capabilities to the first endpoint, audio data can be provided from the first endpoint to at least one endpoint of the plurality of endpoints in the conferencing session.

14 Claims, 6 Drawing Sheets

(56) References Cited

U.S. PATENT DOCUMENTS

2007/0239885 A1* 10/2007 Vadlakonda ............ H04M 3/56
709/232
2009/0143029 A1* 6/2009 Matsumoto ......... H04L 65/4061
455/90.2

FOREIGN PATENT DOCUMENTS

WO    WO 2016/161599 A1    10/2016
WO    WO 2016161599 A1 *  10/2016  ......... H04L 65/4061
WO    WO 2017/111531 A1    6/2017

OTHER PUBLICATIONS

Integrating Radio and Push-to-Talk Into Unified Communications, Russell Bennett, UC Insights (http://ucinsights.com/authored_papers/Integrating-Radio-With-UC.html) (Jul. 2011; Accessed: Jul. 19, 2018; 4 pages).

* cited by examiner

IMPLEMENTING PUSH-TO-TALK IN A MULTIMEDIA CONFERENCING SYSTEM

FIELD

The present disclosure relates generally to multimedia conferencing systems, and more particularly to implementing push-to-talk (PTT) communication techniques in multimedia conferencing systems.

BACKGROUND

Two-way radio devices provide users access to PTT services, particularly PTT voice communications. In a typical PTT voice communication system, such as a mobile radio system, the two-way radio devices enable users to exchange voice communications with others listening in. PTT voice communication systems generally support half-duplex communication techniques where only one member of a talk group can transmit and speak at a time, while the remaining members listen. When the transmit channel is released, other members may push to talk, e.g., key a radio, and seize control of the transmitting capabilities until the transmit capabilities are released. To regulate who has the transmitting function, control signaling may be used to block other PTT users from transmitting. Some PTT voice communication systems use voice activated detection (VAD), preventing transmission when voice signals are being received. PTT voice communication systems are often used by first responders and other security, public safety, and private user groups to facilitate immediate and efficient voice communications within a radio network's coverage area.

Some PTT voice communication systems can be bridged or patched into conferencing sessions (e.g. video conferencing sessions) associated with multimedia conferencing systems so that the users of the PTT voice communication systems can communicate with users of the conferencing sessions. Such conferencing systems typically provide for a central conference server or platform that manages participant connections to the conferencing sessions and receives and distributes multimedia voice and video to and from conference participants. This may be accomplished, for instance, using Session Initiation Protocol (SIP) and H.323 standards and/or using web browser clients connecting to a conference remote web application server with WebRTC enabled. Such conferencing sessions typically use full duplex audio communication techniques wherein any participant may transmit voice input into the conferencing session and simultaneously receive audio transmitted from other transmitting participants.

SUMMARY

Aspects and advantages of embodiments of the present disclosure will be set forth in part in the following description, or may be learned from the description, or may be learned through practice of the embodiments.

One example aspect of the present disclosure is directed to implementing floor control in a conferencing session. The method includes implementing, by one or more computing devices, a push-to-talk mode in a conferencing session associated with a conferencing system comprising a plurality of endpoints. At least one of the endpoints is a full duplex endpoint. The method further includes receiving, by the one or more computing devices, a transmission capabilities request from a first endpoint of the conferencing session. The method further includes granting, by the one or more computing devices, transmission capabilities to the first endpoint based at least in part on one or more floor control parameters associated with the conferencing session. The method further includes, subsequent to granting transmission capabilities to the first endpoint, providing, by the one or more computing devices, audio data from the first endpoint to at least one endpoint of the plurality of endpoints.

Other aspects of the present disclosure are directed to systems, apparatus, tangible, non-transitory computer-readable media, user interfaces and devices for providing PTT communication techniques.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
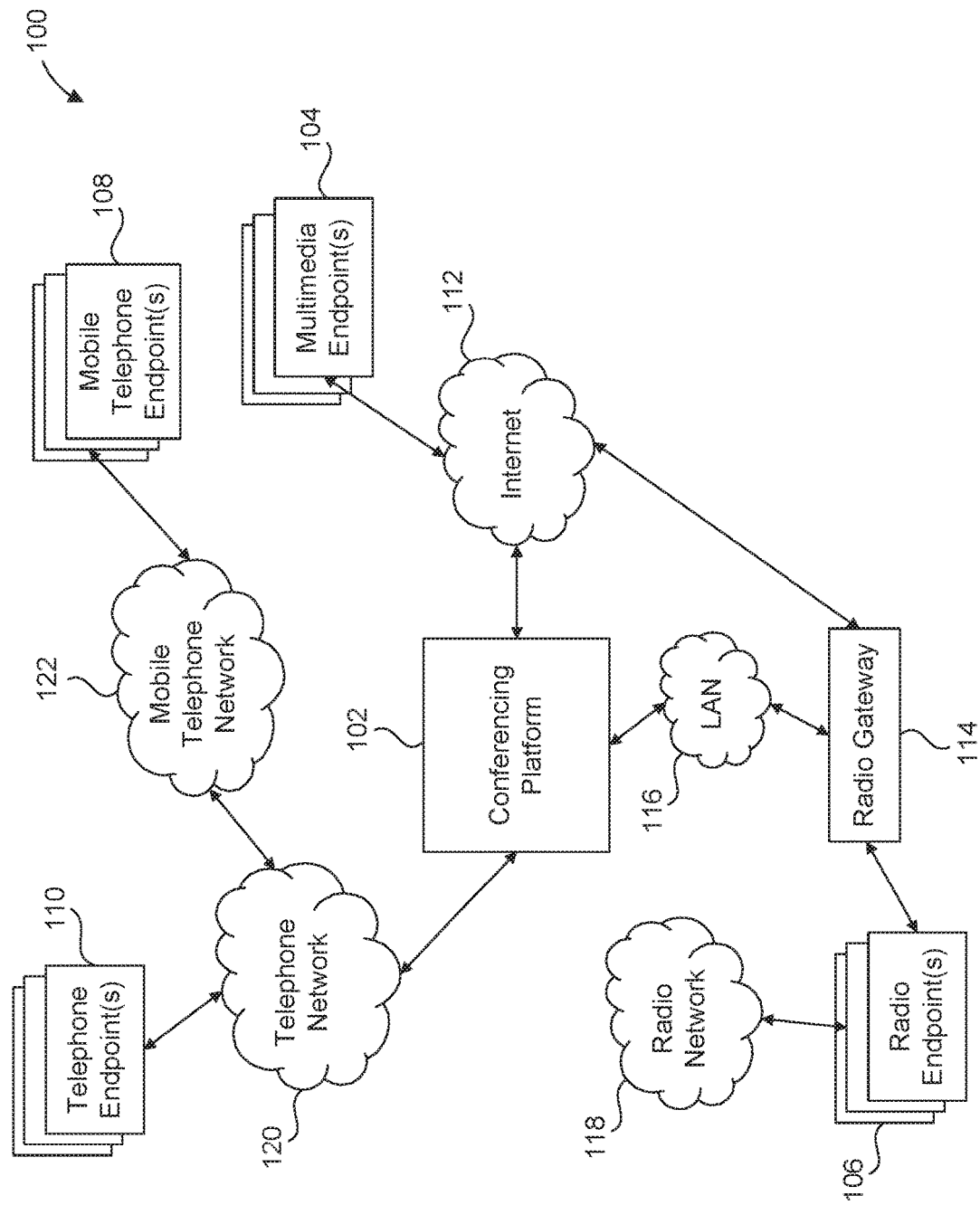
FIGS. 1 and 2 depict example interoperable multimedia conferencing systems according to example aspects of the present disclosure.

Reference will now be made in detail to embodiments, one or more examples of which are illustrated in the drawings. Each example is provided by way of explanation of the embodiments, not limitation of the invention. In fact, it will be apparent to those skilled in the art that various modification and variations can be made to the embodiments without departing from the scope or spirit of the present disclosure. For instance, features illustrated or described as part of one embodiment can be used with another embodiment to yield a still further embodiment. Thus it is intended that aspects of the present disclosure cover such modifications and variations.

Example aspects of the present disclosure are directed to implementing push-to-talk (PTT) audio communication techniques in a conferencing session associated with an interoperable multimedia conferencing system. The conferencing system can include a conferencing platform that facilitates multimedia communications between two or more endpoints in a conferencing session via one or more suitable networks. For instance, the endpoints can provide data (e.g. audio data and/or video data) to the conferencing platform, and the conferencing platform can distribute the data to one or more destination endpoints such that each endpoint can receive the data from the other endpoints in real-time or near real-time during a conferencing session. According to example aspects of the present disclosure, the conferencing session can be selectively operated in a PTT mode that regulates the transmission of audio data in the conferencing session. While operating in the PTT mode, audio data is sent and/or received in accordance with floor control parameters, such that only one endpoint is capable of transmitting audio data to the other endpoints at a given time.

More particularly, the conferencing session can be selectively operated in a continuous mode and the PTT mode. The continuous mode can include an "open floor" wherein audio data is freely transmitted without regard to the floor control parameters. The continuous mode can allow endpoints to simultaneously transmit audio data such that a single endpoint can simultaneously receive and output (e.g. by a speaker device) audio data from multiple endpoints in the conferencing session. In this manner, the user of an endpoint may be able to simultaneously hear overlapping audio from multiple endpoints. In some implementations, the continuous mode can operate in accordance with the full duplex transmission capabilities of the full duplex communication devices. As indicated, the PTT mode can include a "floor control," wherein audio transmission capabilities are granted to a single endpoint at a given time, such that only one endpoint may be permitted to transmit audio data at a given time. For instance, the users of the endpoints can request transmission capabilities via interaction with their respective endpoints, and transmission capabilities may be granted or denied to the endpoints based at least in part on the floor control parameters.

As indicated, the conferencing system can facilitate interoperable communications between various suitable endpoints. For instance, the endpoints can include full duplex endpoints, such as telephones (e.g. land lines), user computing devices (e.g. mobile telephones, smartphones, tablet computers, laptop computers, desktop computers, wearable computing devices, etc.), and/or other suitable full duplex communication devices. The endpoints can further include half duplex (or simplex) endpoints, such as two-way radios or other suitable half duplex (or simplex) communication devices. As used herein, the term "half duplex endpoint" refers to communications devices that are operating using half duplex, simplex, and/or other suitable communication techniques. In some implementations, the half duplex endpoints may not be capable of operating using full duplex communication techniques. More generally, an endpoint may be any audio communication device, including but not limited to, analog or digital telephone stations, mobile telephones, two-way radios, two-way radio consoles, software defined radios, that are capable, either directly or indirectly, of sending audio messages to, or receiving audio messages from, another endpoint or conference server or conference switch enabling a conference session.

As indicated, the communication modes (e.g. continuous mode and PTT mode) can be selectively implemented within a conferencing session. For instance, in some implementations, the conferencing session can be operated in the PTT mode when one or more half duplex endpoints, such as two-way radios, are included within the conferencing session. When a conferencing session operating in the continuous mode includes one or more half duplex endpoints and one or more full duplex endpoints, the half duplex endpoints may still operate using half duplex and/or PTT communication techniques while the full duplex endpoints operate in the continuous mode using full duplex communication techniques. In such implementations, the full duplex endpoints are able to simultaneously send and receive audio data, while the half duplex endpoints are unable to transmit audio to the other endpoints while simultaneously receiving audio from one or more other endpoints. In this regard, the half duplex endpoints will only be able to transmit audio to the other endpoints in the conferencing session at times when no other endpoint is transmitting audio. As the full duplex endpoints are each able to simultaneously transmit audio data to the other endpoints, it can be difficult for the users of the half duplex endpoints to find a suitable timeslot (e.g. when no other endpoint is communicating) in which audio data can be transmitted to the other endpoints in the conferencing session, especially as the number of endpoints in the conferencing session increases.

In this manner, in some implementations, conferencing sessions that include half duplex and full duplex endpoints can operate in the PTT mode, such that only one endpoint in the conferencing session is capable of transmitting audio to the other endpoints at a given time. In some implementations, the PTT mode can be dynamically implemented in a conferencing session upon a detection of one or more half duplex endpoints in the conferencing session. For instance, a conferencing session that includes full duplex endpoints can operate in the continuous mode. Upon a detection of one or more half duplex endpoints, the continuous mode can be suspended and the PTT mode can be implemented. Subsequently, when the one or more half duplex endpoints leave the conferencing session, the PTT mode can be suspended and the continuous mode can be reinstated.

As indicated, when operating in the PTT mode, transmission capabilities can be granted to a requesting endpoint based at least in part on one or more floor control parameters associated with the multimedia conferencing system. In this manner, an endpoint can provide a request for transmission capabilities (and/or audio data) to the conferencing platform. The request can be provided, for instance, responsive to an interaction by a user with a PTT control associated with the endpoint. The PTT control can be a user interface control element, a physical (e.g. mechanical) control element, or other suitable control element. In some implementations, the endpoint may provide the request responsive to detecting a voice input by a user. In certain embodiments, the user interface control element may be a graphical user interface (GUI) control which is part of a conference application, where the PTT control, when activated by the user of the conference application, initiates the transmission of, or sends a message requesting the authority or permission to transmit or send, an audio message from the conference application to a conference hub or an endpoint, either directly or indirectly. A GUI control, which may be a part of a user's conference application, may be coupled to the resident or connected microphone control module of the audio processing components of the host computing device. In these embodiments, the GUI control may activate and deactivate the microphone muting function, block or unblock the audio bus function or transmission path to the conference application, or disable or enable audio processing functions, such that no audio input may be detected, formed, transformed, encoded or transcoded, or otherwise formed, or transmitted by the conference application to the conference hub or other endpoint, or to block the transmission of audio messages sent to or available to the conference application to be transmitted.

The floor control parameters can provide a framework for determining whether to grant transmission capabilities to a requesting endpoint. In some implementations, the floor control parameters can include rules or specifications for determining priorities between two or more endpoints in the conferencing session. More particularly, the floor control parameters can resolve the priorities based at least in part on floor control parameter data, such as the current floor allocation (e.g. whether an endpoint currently has transmission capabilities), the order and/or timing of requests, and/or other suitable floor control parameters. The floor control parameter data can further include contextual floor control parameter data, such as the identities the endpoints (or endpoint users) in the conferencing session, attributes or characteristics associated with the endpoints (or endpoint users) in the conferencing session, the relative ranks associated with the endpoints (or endpoint users) in the conferencing session, contextual information asserted by the endpoints (or endpoint users) in the conferencing session, relative importance of the endpoints (or endpoint users) in the conferencing session, the endpoint types of the endpoints in the conferencing session, or the locations of the endpoints in the conferencing session, and/or other suitable parameter data.

In some implementations, the floor control parameter data can vary over time to reflect changing circumstances or contexts. For instance, the data associated with the location parameter can be updated as the location of the endpoints change. As another example, the relative importance of the endpoints can change depending on the surrounding situation or context, the identities of the endpoint users, the location of the users, and/or other suitable factors. The priorities of various endpoints can change based at least in part on such changing data. In this manner, the determination of whether to grant transmission capabilities to a requesting endpoint can reflect changing circumstances and contexts as specified in the floor control parameter data.

It will be appreciated that any suitable floor control parameter data can be used without deviating from the scope of the present disclosure. In some implementations, the floor control parameters can be set by a user to reflect the particular circumstances or contexts surrounding the conferencing session. As a particular example, the conferencing system may be used by first responders and/or field personnel dealing with suspicious activities, emergency situations or other events. The floor control parameter data can include data indicative of a field personnel's profession, specific skill-set, expertise, and/or knowledge of how a specific type of equipment operates. The floor control parameter data can further include data indicative of a particular event or context to which the file personnel is responding. If the field personnel is equipped to handle or manage the event (e.g. as evidenced by the field personnel's skill set, profession, etc. as specified by the floor control parameters), the relative importance of the field personnel as specified in the floor control parameters can increase, and the field personnel may be given a higher priority in gaining transmission capabilities.

In this manner, in some implementations, the determination of whether to grant transmission capabilities to a requesting endpoint can be dynamically made in accordance with variable floor control parameter data, for instance, to reflect changing contexts or circumstances. As indicated, the floor control parameters may be used to establish priorities between various endpoints in the conferencing session. In some implementations, the priorities can be used to determine whether to grant transmission capabilities to an endpoint. For instance, an endpoint that requests transmission capabilities while the floor is "open" (e.g. no endpoint is transmitting) can be granted the transmission capabilities. If multiple opposing endpoints request transmission capabilities simultaneously (or nearly simultaneously) when the floor is open, a priority can be determined between the opposing endpoints based at least in part on the floor control parameters, and transmission capabilities can be granted to the opposing endpoint with the highest priority. Users can also request transmission capabilities when the floor is "taken," (e.g. at a time when an endpoint has transmission capabilities. In this manner, a user may request to interrupt a transmitting endpoint. In such instance, the request can be granted and transmission capabilities can be taken from the currently transmitting endpoint and granted to the requesting endpoint, or the request can be denied and transmission capabilities can remain with the currently transmitting endpoint. Such determination can be made based at least in part on priorities between the endpoints determined based at least in part on the floor control parameters.

In this manner, in some implementations, transmission capabilities may be revoked from a currently transmitting endpoint responsive to a request from an interrupting endpoint having a higher priority than the currently transmitting endpoint. In some implementations, transmission capabilities may be revoked responsive to the currently transmitting endpoint releasing the transmission capabilities. The endpoint may release transmission capabilities, for instance, responsive to an interaction by the user with the PTT control (e.g. when the user releases the PTT control element), responsive to detecting the user cease speaking, subsequent to the expiration of a predetermined time allotment given to the endpoint to transmit, and/or in other suitable circumstance. As another example, transmission capabilities may be revoked by the conferencing platform prior to the endpoint releasing transmission capabilities, such as subsequent to the expiration of a predetermined time allotment, or other suitable circumstance. In some implementations, endpoints may not be permitted to interrupt a currently transmitting endpoint. In such implementations, the priority of the endpoints may not be determined, as interruptions are not permitted. In this manner, transmission capabilities may be revoked when they are released by the endpoint or in other circumstance, such as at the expiration of a time allotment.

With reference now to the figures, example aspects of the present disclosure will be discussed in greater detail. For instance, FIG. 1 depicts an example multimedia conferencing system 100 according to example aspects of the present disclosure. The conferencing system 100 includes a conferencing platform 102, multimedia endpoint(s) 104, radio endpoint(s) 106, mobile telephone endpoint(s) 108, and telephone endpoint(s) 110. The multimedia endpoint(s) 104 can include any suitable user computing device, such as a smartphone, tablet, laptop, desktop, wearable computing device, etc. The multimedia endpoint(s) 104 can communicate, for instance, via a conferencing application installed or otherwise implemented by the computing device. In this manner, the multimedia endpoint(s) 104 can be capable of providing audio and/or video data to the conferencing platform via the conferencing application. The radio endpoint(s) 106 can include two-way radios or other suitable devices that communicate using PTT techniques. The mobile telephone endpoint(s) 108 and/or the telephone endpoint(s) 110 can communicate with the conferencing platform via a dial-in telephone number that can be bridged to the conferencing platform 102. The mobile telephone endpoint(s) 108 can include, for instance, cellular telephones or other suitable devices and the telephone endpoint(s) 110 can include, for instance, land line telephones. In certain embodiments, the conferencing application may be an instance of a software application operating on a computing device such as a personal computer, mobile smartphone, tablet or wearable computing device, that is capable of receiving and sending audio communications from or sending audio communications to at least one other endpoint in the conference and the audio transmission sent from conference application is transmitted, or capable of being transmitted, simultaneously or near simultaneously to all other endpoints in the conference.

Each endpoint 104-110 is communicatively coupled to the conferencing platform 102 via one or more suitable networks and/or gateways. More particularly, as shown in FIG. 1, the multimedia endpoint(s) 104 communicate with the conferencing platform 102 via the Internet 112, the radio endpoint(s) 106 communicate with the conferencing platform 102 via a radio gateway 114 and a local area network 116. The radio endpoint(s) 106 further communicate among each other via a radio network 118. The radio network 118 can be a radio over internet protocol (ROIP) network or other suitable network. In this manner, communications among the radio endpoint(s) 106 can be facilitated by the radio network 118, and such communications can further be bridged or patched to the conferencing platform 102 via the radio gateway 114. The mobile telephone endpoint(s) 108 communicate with the conferencing platform 102 via a mobile telephone network 120 and a public telephone network 122. The telephone endpoint(s) 110 (e.g. land line telephones) communicate with the conferencing platform 102 via the public telephone network 122. The multimedia endpoint(s) 104, mobile telephone endpoint(s) 108, and telephone endpoint(s) 110 can be full duplex endpoints that operate using full duplex communication techniques. The radio endpoint(s) 106 can be half duplex endpoints that operate using half duplex and/or simplex communication techniques.

The endpoints 104-110 can communicate with the conferencing platform 102 using any suitable communication protocol or technique, such as Session Initiation Protocol (SIP), H.323, WebRTC, and/or other suitable communication protocol. Further, audio and/or video data provided by the endpoints 104-110 can be provided to the conferencing platform 102 in any suitable data format, using any suitable protocol. In some implementations, audio and/or video data provided to the conferencing platform 102 can be converted to a suitable data format compatible with the conferencing platform 102. For instance, audio data provided by the radio endpoint(s) 106 can be converted to such a compatible format by the radio gateway 114 and provided to the conferencing platform 102 via the local area network 116. Similarly, audio data provided by the telephone endpoint(s) 110 can be converted to a compatible format and bridged or patched to the conferencing platform 102.

It will be appreciated that the multimedia conferencing system 100 is depicted for illustrative purposes only. It will further be appreciated that other suitable conferencing systems can be used without deviating from the scope of the present disclosure. More particularly, such suitable conferencing systems can include various other endpoints or endpoint types that can be communicatively coupled to the conferencing platform in any suitable manner using any suitable networks, gateways or other intermediaries. In some implementations, the conferencing platform can be implemented at a central server (e.g. conferencing platform 102 in FIG. 1), or within an endpoint, such as a multimedia endpoint 104. In some implementations, the conferencing system can be implemented as a peer-to-peer conferencing system using a mesh structure. In some implementations, the conferencing system can include one or more conferencing hubs that facilitate communication between the conferencing platform and the endpoints. For instance, the conferencing hub(s) can receive data from one or more endpoints and relay the data to the conferencing platform. In such implementations, the conferencing hub(s) can perform one or more functions of the conferencing platform. For instance, a conferencing hub may be configured to perform one of the functions described with respect to the conferencing platform 202 and/or the methods (300), (400), and (500) as respectively depicted in FIGS. 2, 3, 4, and 5, described below.

In implementations wherein the conferencing system is a peer-to-peer system, one or more of the endpoints in a conferencing session can be configured to regulate the floor control while operating in the PTT mode. For instance, an endpoint can be assigned as the floor controller using any suitable policy, scheme, rule set, algorithm, etc. For instance, the assigned floor controller can be the endpoint initiating the conferencing session, the endpoint having the best communication response time, the endpoint having the shortest communications path, the endpoint having the lowest packet loss and/or other suitable endpoint. As another example, the floor controller can be assigned based at least in part on a vote by some or all of the endpoints in the conferencing session.

Figure 2:
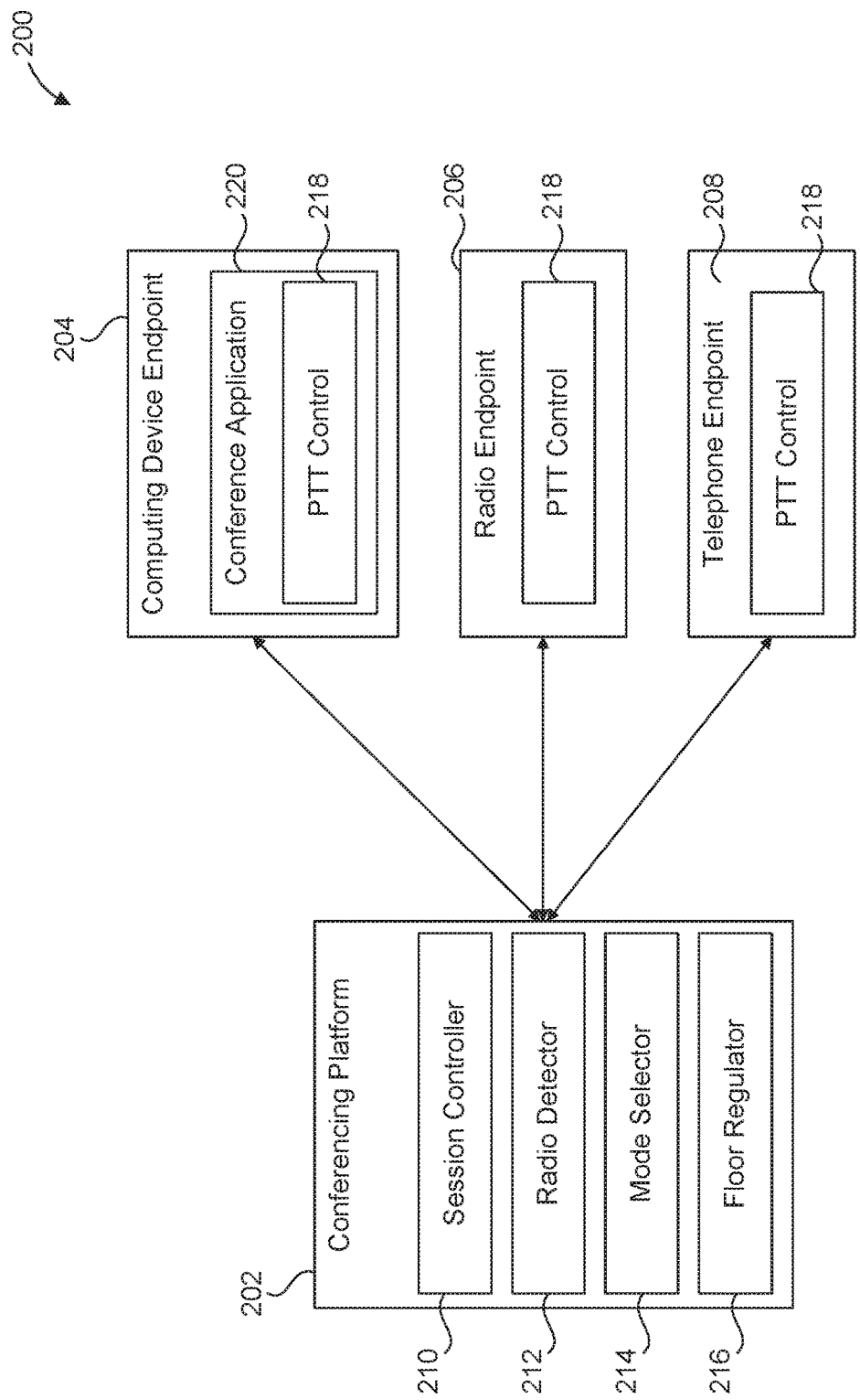

FIG. 2 depicts an example multimedia conferencing system 200 according to example aspects of the present disclosure. The conferencing system 200 includes a conferencing platform 202, a computing device endpoint 204, a radio endpoint 206, and a telephone endpoint 208. The conferencing system 200 can correspond to the conferencing system 100 of FIG. 1, and the conferencing platform 202, the computing device endpoint 204, radio endpoint 206, and telephone endpoint 208 can respectively correspond to the conferencing platform 102, multimedia endpoint(s) 104, radio endpoint(s) 106, and telephone endpoints (e.g. mobile telephone endpoint(s) 108 or telephone endpoint(s) 110) of FIG. 1.

The conferencing platform 202 can include a session controller 210, a radio detector 212, a mode selector 214, and a floor regulator 216. The session controller 210 can initiate a conferencing session, manage the participants (e.g. endpoints) and/or control the distribution and provisioning of data (e.g. audio data, video data, messages, etc.) to and from the endpoints 104-108 during the conferencing session. For instance, the session controller 210 can receive audio and/or video data from a first endpoint and can relay the data to one or more other endpoints in the conferencing session. The session controller 210 can communicate with the endpoints 204-210 using any suitable communication protocol or standard, such as Session Initiation Protocol (SIP), H.323, WebRTC, and/or other suitable communication protocol. The radio detector 212 can be configured to detect the presence of a radio system (e.g. one or more radio endpoints, such as radio endpoint 206) within a conferencing session. For instance, radio detector 212 can be configured to detect a connection of a radio gateway (e.g. radio gateway 114 of FIG. 1) and/or one or more radio endpoints to the conferencing system 200. Such detection may occur based at least in part on a reception of a radio resource presence message provided by the radio system. The radio resource presence message can include identifying data associated with the radio endpoints 206, radio gateway (e.g. radio gateway 114), and/or other components associated with the radio system. In some implementations, upon a detection of a radio system, the radio detector 212 can provide an indication of the presence of the radio system to the mode selector 214.

The mode selector 214 can select the communication mode in which the conferencing session should operate, and can implement or invoke the selected mode within the conferencing session. The mode selector 214 can select the communication mode prior to and/or during a conferencing session, such that the communication mode can be dynamically changed during the conferencing session. The mode selector 214 can select a communication mode based on any suitable factor. In some implementations, the mode selector can select and implement a communication mode in response to an input from a user indicative of a request for the conferencing session to operate in a particular communication mode. The conferencing session can operate in a continuous mode or in a PTT mode. The continuous mode can provide an open floor to the endpoints such that the endpoints in the conferencing session can simultaneously transmit and receive audio data to and from the other endpoints in the conferencing session. In this manner, the conferencing session can operate in accordance with the full duplex communication capabilities of the computing device endpoint 204 and the telephone endpoint 208. The PTT mode can implement floor controls, such that only one endpoint is permitted to transmit audio data at a given time. In this manner, while in the PTT mode, the conferencing session can operate in accordance with the half duplex communication capabilities of the radio endpoint 206. Upon a selection of the communication mode by the mode selector 214, the conferencing platform 202 can provide a message to the endpoints 204-208 informing them of the current communication mode of the communication session.

In some implementations, the mode selector 214 can select and implement the PTT mode within the conferencing session in response to a detection of a radio system. In instances wherein one or more radio endpoints (e.g. radio endpoint 206) or other half duplex endpoints are included in the conferencing session, such endpoints may still operate using half duplex and/or PTT communication techniques that implement a floor control and allow for only one such endpoint to transmit at a given time. In this manner, the half duplex endpoints will still need to gain transmission capabilities (at a time when no other endpoint is transmitting) before the half duplex endpoints will be able to transmit. The mode selector 214 may thus select and implement the PTT mode upon receiving an indication from the radio detector 212 that a radio system is present in the conferencing session.

Upon implementation of the PTT mode, the mode selector 214 can instruct the floor regulator 216 to implement floor controls in accordance with the PTT mode. Further, upon the implementation of the PTT mode, the floor regulator 216 can regulate the audio transmission capabilities of the endpoints 204-208 based at least in part on a set of floor control parameters associated with the conferencing system 200. As indicated, the floor control parameters can include rules, algorithms, or guidelines for determining priorities between two or more endpoints such that a determination can be made as to whether to grant transmission capabilities to a requesting endpoint. In certain embodiments, the floor control function may grant authority to any one or more endpoints to transmit audio from endpoints to other endpoints in a conference upon an endpoint requesting permission to transmit audio to other endpoints. The floor control function may be a floor control module, which may be a software program or utility coupled to a conference hub server application that controls the transmission, retransmitted, relay, broadcast or distribution of audio transmissions received from an endpoint based upon whether the transmitting endpoint is requesting to send, is sending or has sent an audio transmission to the conference hub, where the signal may be any message protocol or format conveying information to the floor control function. The granting or denying of a request to transmit is determined based on a module comprised of programmatic rules or parameters used by the floor control module where such rules and parameters may choose priority among transmit assertions or requests based on such factors as the identity of the conference endpoint or user associated with the conference endpoint, the relative rank or priority of the of the transmitting conference endpoint or associated user, information asserted by the requesting conference endpoint which represents any exigent condition or circumstance, relative or relative importance, the type of conference endpoint, the location of conference endpoint or proximity to an object or location of interest, or any other external data that may be referenced by subject, time or location, such as, but not limited to, alarms, sensor data or events reported by external systems.

The floor control functionality described above may be a programmatic module coupled to or part of one or more instances of a conference application, and one such module associated or coupled to a conference application may be designated as the floor control function among all endpoints within a peer to peer, hybrid peer, conference with no central conference hub or conference hub-based conference; where the designation of the floor control function associated with an endpoint having transmission modulating authority over endpoints in a conference may be based upon policies or algorithms that designate the floor control function coupled to an endpoint over one or more other floor control functions associated or coupled with other endpoint floor control functions, including the following: (a) a pre-determined set of rules establishing priorities among endpoints with floor control modules, such as, but not limited to, the endpoint initiating the conference session being designated the controller, communications response time or shortest communication path between or among peers, packet loss rates, average packet loss over sampling periods, noise levels or other quantitative parameters of reliability, speed, quality or suitability, physical location of an floor control function, ownership, possession or control identity of the floor control function or other intermediary routing points; (b) by consensus voting schemes among one or more endpoints; (c) by a combination of consensus voting schemes coupled with pre-determined rules where weighted voting algorithms may be applied; (d) there may be an order of ranking or preference among endpoint controllers, whereby the order or ranking is communicated among peer clients; (e) there may be presence or advertisement messages that are sent or broadcast among or between endpoints or conference hub and endpoint indicating the functional presence or availability of a floor control function associated with the endpoint; and (f) where more than two endpoints are present in a conference session where a floor control function associated with an endpoint's floor control function is designated as the session controller for floor functions and the endpoint is no longer a member of the conference or its coupling or communications are interrupted, blocked or impaired, the floor control function may be transferred or assumed by another floor control function utilizing the policies, rules and methods above.

More particularly, the floor control parameters can include floor control parameter data, such as the current floor allocation (e.g. whether an endpoint currently has transmission capabilities), the order and/or timing of requests, and/or contextual floor control parameter data, such as the identities the endpoints (or endpoint users) in the conferencing session, attributes or characteristics associated with the endpoints (or endpoint users) in the conferencing session, the relative ranks associated with the endpoints (or endpoint users) in the conferencing session, contextual information asserted by the endpoints (or endpoint users) in the conferencing session, relative importance of the endpoints (or endpoint users) in the conferencing session, the endpoint types of the endpoints in the conferencing session, or the locations of the endpoints in the conferencing session, and/or other suitable parameter data. In certain embodiments, the granting or denying of a request to transmit is determined based on a module comprised of programmatic rules or parameters used by the floor control module where such rules and parameters may choose priority among transmit assertions or requests based on such factors as the identity of the endpoint or user associated with the endpoint, the relative rank or priority of the of the transmitting endpoint or associated user, information asserted by the requesting endpoint which represents any exigent condition or circumstance, relative or relative importance, the type of endpoint, the location of endpoint or proximity to an object or location of interest, or any other external data that may be referenced by subject, time or location, such as, but not limited to, alarms, sensor data or events reported by external systems.

In some implementations, data for one or more of the floor control parameters can be input by one or more users. For instance, a user can input data associated with a context, situation, rank of the endpoint users, etc. In some implementations, data for one or more of the floor control parameters can be determined automatically. For instance, an endpoint may automatically specify location data associated with the endpoint based at least in part on a location determination by a positioning system (e.g. GPS system) associated with the endpoint. In some implementations, the floor control parameter data can vary over time to reflect changing circumstances or contexts. For instance, the data associated with the location parameter can be updated as the location of the endpoints change. As another example, the relative importance of the endpoints can change depending on the surrounding situation or context, the identities of the endpoint users, the location of the users, and/or other suitable factors. The priorities of various endpoints can change based at least in part on such changing data. In this manner, the determination of whether to grant transmission capabilities to a requesting endpoint can reflect changing circumstances and contexts as specified in the floor control parameter data.

In this manner, the conferencing platform 202 can receive a request for transmission capabilities and/or audio data from a requesting endpoint. For instance, the request for transmission capabilities may be provided with the audio data, or may be provided separate from the audio data. In response, the floor regulator 216 can determine whether to grant or deny transmission capabilities to the requesting endpoint based at least in part on the floor control parameters. As an example, the computing device endpoint 204 can request transmission capabilities at a time when the floor is open (e.g. no other endpoint has transmission capabilities). The floor regulator 216 can determine that the floor is open, and can grant transmission capabilities to the requesting endpoint 204 based at least in part on the floor control parameters. The radio endpoint 206 can subsequently provide a request for transmission capabilities to the conferencing platform 202 while the computing device endpoint 204 has transmission capabilities. The floor regulator 216 can determine a priority between the computing device endpoint 204 and the radio endpoint 206 based at least in part on the floor control parameters. The floor regulator 216 can grant or deny transmission capabilities to the requesting radio endpoint 206 based at least in part on the priority. If the floor regulator 216 grants transmission capabilities, the floor regulator can suspend the transmission capabilities of the computing device endpoint 204 and grant transmission capabilities to the radio endpoint 206. Upon granting or denying transmission capabilities to a requesting endpoint, the conferencing platform 202 can provide a message to the requesting endpoint informing the endpoint that transmission capabilities have been granted or denied.

Upon granting transmission capabilities to a requesting endpoint, the floor regulator 216 can facilitate the provision of audio data from the endpoint to the other endpoints in the conferencing session. For instance, the floor regulator 216 may instruct the session controller to allow transmissions from the endpoint to be relayed to the other endpoints. Further, the floor regulator 216 can implement a data block for the other endpoints in the conferencing session. For instance, in some implementations, the floor regulator 216 can instruct the session controller 210 to implement the data block, such that the session controller 210 will not relay data received from the blocked endpoints to the other endpoints in the conferencing session. In some implementations, the conferencing platform 202 can provide a message to the individual blocked endpoints instructing them not to send data to the conferencing platform 202 while blocked. In this manner, whether the conferencing platform 202 or the individual blocked endpoints implement the data block, only data transmitted by the endpoint to whom transmission capabilities have been granted will be provided to the other endpoints.

In some implementations, the endpoints 204-208 can implement the PTT control functions (e.g. audio data transmission and/or audio data block) by regulating the respective audio transmissions by the endpoints 204-208. Such regulation can be implemented in various suitable manners. For instance, in some implementations, one or more of the endpoints 204-208 can implement the control by transmitting or refraining from transmitting audio data input by the user. In some implementations, one or more of the endpoints 204-208 can implement the control by instructing a microphone control module associated with the endpoint(s) to activate or deactivate the microphone mute function, microphone component function, the audio bus, and/or processing transmission path (e.g. to the conferencing application 220), to regulate the transmission of audio data associated with the endpoint(s). As another example, the telephone endpoint 208 can implement the control using a dual-tone multi-frequency (DTMF) signal that can instruct a telephone switch, communications server, etc. to transmit or not transmit audio data from the telephone endpoint 208 to the other endpoints. As indicated, in some implementations, the PTT control can be implemented at the conferencing platform 202 and/or at a conferencing hub associated with the conferencing system 200. For instance, the conferencing platform 202 can receive audio data from the endpoints 204-208, and the floor regulator 216 can determine whether to relay the received audio data. In some embodiments, PTT control may be coupled to or part of a microphone device which is connected to computing device's audio processing system, such as but not limited to a universal serial bus (USB), Bluetooth® or broadband cellular wireless (e.g., 4G, 5G) connected speaker and microphone head set with an associated PTT control bottom or switch, or is a part or a telephonic communications device whereby the source audio is transmitted from the microphone to the host device by means of a mechanical or digital relay or other switch mechanism.

When operating in the PTT mode, the endpoints 204-208 can implement a PTT control element 218 that allows users of the endpoints 204-208 to request transmission capabilities form the conferencing platform. In this manner, a user of the endpoints 204-208 can interact with the PTT control elements 218 to request transmission capabilities from the conferencing platform 202 and/or to provide audio data to the conferencing platform 202. For instance, as indicated, the computing device endpoint 204 can include a conference application 220 that facilitates communication to and from the computing device endpoint 204 within the conferencing session. The conferencing application 220 can be a dedicated conferencing application installed on endpoint 204, or the conferencing application 220 can be implemented within a web browser installed on the endpoint 204. In some implementations, the PTT control element 218 of the computing device endpoint 204 can be, for instance, a user interface element within the conference application. In some implementations, the PTT control element 218 can be displayed upon an implementation of the PTT mode by the conferencing platform 202. In some implementations, the PTT control element 218 can be a physical control element, such as a mechanical button or other hardware implemented control element. In some implementations, the PTT control element 218 may be a voice detecting element that detects a voice input from the user and interprets the voice input as a request to send audio data. The PTT control elements 218 of the radio endpoint 206 and telephone endpoint 208 can also include similar user interface control elements and/or physical control elements. In some embodiments, a conferencing application coupled to a conferencing hub server application whereby control messages are sent to the conferencing hub by the conferencing application which may be a request to permit audio to be transmitted, retransmitted, broadcast, relayed, or redistributed from the conference application to other endpoints, either directly on a peer-to-peer or hybrid peer basis, or via the conference hub.

Figure 3:
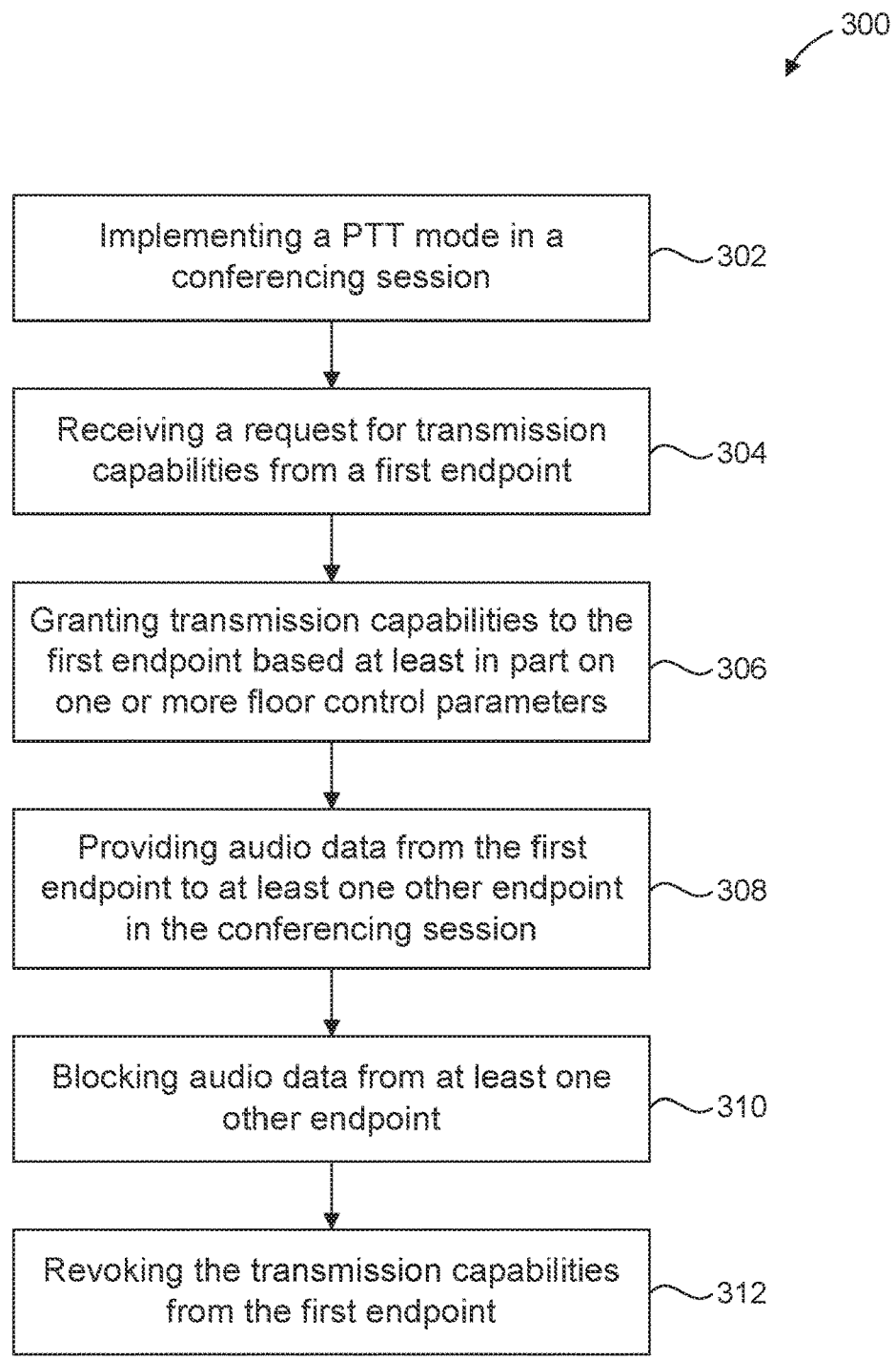
FIG. 3 depicts a flow diagram of an example method of implementing PTT communication techniques in a multimedia conferencing system according to example aspects of the present disclosure.

FIG. 3 depicts a flow diagram of an example method (300) of operating a conferencing session in a PTT mode according to example aspects of the present disclosure. The method (300) can be implemented by one or more computing devices, such as one or more of the computing devices depicted in FIG. 6. More particularly, in some implementations, the method (300) can be implemented by one or more of the session controller 210, the radio detector 212, the mode selector 214, and the floor regulator 216 depicted in FIG. 2. In addition, FIG. 3 depicts steps performed in a particular order for purposes of illustration and discussion. Those of ordinary skill in the art, using the disclosures provided herein, will understand that the various steps of any of the methods disclosed herein can be omitted, adapted, modified, rearranged, or expanded in various ways without deviating from the scope of the present disclosure.

At (302), the method (300) can include implementing a PTT mode in a conferencing session associated with a multimedia conferencing system. The conferencing session can include real time or near real time audio and/or video communications between two or more endpoints communicatively coupled to a conferencing platform. The conferencing system can be, for instance, correspond to conferencing systems 100 or 200 respectively depicted in FIGS. 1 and 2, or other suitable conferencing system. In this manner, the endpoints can include full duplex endpoints (e.g. computing device endpoints, telephone endpoints, mobile telephone endpoints, etc.) that communicate using full duplex communication techniques, and half duplex endpoints (e.g. two-way radio endpoints, etc.) that communicate using half duplex or simplex communication techniques, and/or other suitable endpoints. As indicated, the endpoints can be communicatively coupled to the conferencing platform via one or more suitable networks, gateways, and/or other intermediaries.

The conferencing system can be configured to selectively operate a conferencing session in a continuous mode or a PTT mode. The continuous mode can include an open floor wherein multiple endpoints can simultaneously have transmission capabilities. In this manner, multiple endpoints can transmit audio data simultaneously, such that the transmitted audio data can be simultaneously (or in an overlapping manner) received by the other endpoints in the conferencing session. The received audio data can then be output by the speaker devices simultaneously (or in an overlapping manner) such that the users of the endpoints are able to simultaneously hear audio communications provided by multiple endpoints. The PTT mode can implement floor controls that allow only one endpoint to transmit audio data at a given time. In this manner, endpoints can request transmission capabilities and the transmission capabilities can be granted or denied to the requesting endpoints based at least in part on a plurality of floor control parameters. When an endpoint is granted transmission capabilities, the other endpoints in the conferencing session will not be permitted to provide audio data to the endpoints in the conferencing session. In some implementations, the continuous mode can be the default mode of the conferencing session, and the PTT mode can be implemented to suspend operation of the continuous mode and to operate in the PTT mode. In some implementations, the PTT mode can be implemented responsive to a detection of one or more radio endpoints in the conferencing session.

At (304), the method (300) can include receiving a request for transmission capabilities from a first endpoint in the conferencing session. In some implementations, the request can be provided along with the audio data that the endpoint is requesting to transmit. In some implementations, the request can be provided separately from the audio data. In various instances, the request may be provided while the floor is "open" (e.g. no other endpoint has transmission capabilities) or while the floor is "closed" (e.g. another endpoint has transmission capabilities). The request can be provided, for instance, responsive to an interaction by a user of the first endpoint with a PTT control element associated with the first endpoint. In some implementations, the request can be provided responsive to a detection by the first endpoint of a voice input from the user.

At (306), the method (300) can include granting transmission capabilities to the first endpoint based at least in part on one or more floor control parameters. As indicated, upon receiving a request for transmission capabilities from a requesting endpoint, a determination can be made as to whether to grant the transmission capabilities to the requesting endpoint. In some implementations, the determination can be made based at least in part on the floor control parameters. The floor control parameters can include rules or guidelines for determining a priority between two or more endpoints in the conferencing session and/or data associated with the conferencing session and/or the endpoints in the conferencing session. The decision to grant or deny transmission capabilities can be made based at least in part on the priority. For instance, if the requesting endpoint has a higher priority than a currently transmitting endpoint (e.g. the endpoint that currently has transmission capabilities), the transmission capabilities can be revoked from the currently transmitting endpoint and granted to the requesting endpoint. As another example, if the multiple endpoints simultaneously (or nearly simultaneously) request transmission capabilities, a priority between the requesting endpoints can be determined, and transmission capabilities can be granted to the endpoint with the highest priority.

At (308), the method (300) can include providing audio data from the first endpoint to at least one other endpoint in the conferencing session. As indicated, upon receiving transmission capabilities, the first endpoint is permitted to transmit audio data to the other endpoints in the conferencing session. In this manner, the audio data can be provided to the conferencing platform and relayed by the conferencing platform to the at least one other endpoint.

At (310), the method (300) can include blocking audio data from at least one other endpoint. When an endpoint has transmission capabilities, the other endpoints in the conferencing session can be blocked from transmitting audio data to the other endpoints. The audio block can prevent audio input by the users of the blocked endpoints from reaching the destination endpoints in the conferencing session. In some implementations, the blocked endpoints can transmit audio data to the conferencing platform and the conferencing platform can implement the block by refraining from relaying the audio data to the destination endpoints. In some implementations, the audio block can be implemented by the individual endpoints. For instance, the conferencing platform can provide an indication of the audio block to the blocked endpoints, and the endpoints can refrain from providing audio data to the conferencing platform. The blocked endpoints can implement the audio block in various suitable manners, such as for instance, by suspending operation of one or more microphone devices associated with the endpoints, muting the one or more microphone devices, refraining from sending audio data input by the user, or other suitable technique.

At (312), the method (300) can include revoking the transmission capabilities from the first endpoint. In some implementations, the transmission capabilities can be revoked and granted to an interrupting endpoint (e.g. responsive to a request from an endpoint having a higher priority than the first endpoint). In some implementations, the transmission capabilities can be revoked responsive to a release of the transmission capabilities by the first endpoint. For instance, the first endpoint can release the transmission capabilities responsive to an interaction by the user with the PTT control element indicative of a request by the user to release transmission capabilities. As another example, the first endpoint can release the transmission capabilities upon a detection that the user has ceased providing the voice input (e.g. the user is finished speaking). In some implementations, the transmission capabilities can be revoked, for instance, at the expiration of a time allotment given to the first endpoint for transmitting audio data.

Figure 4:
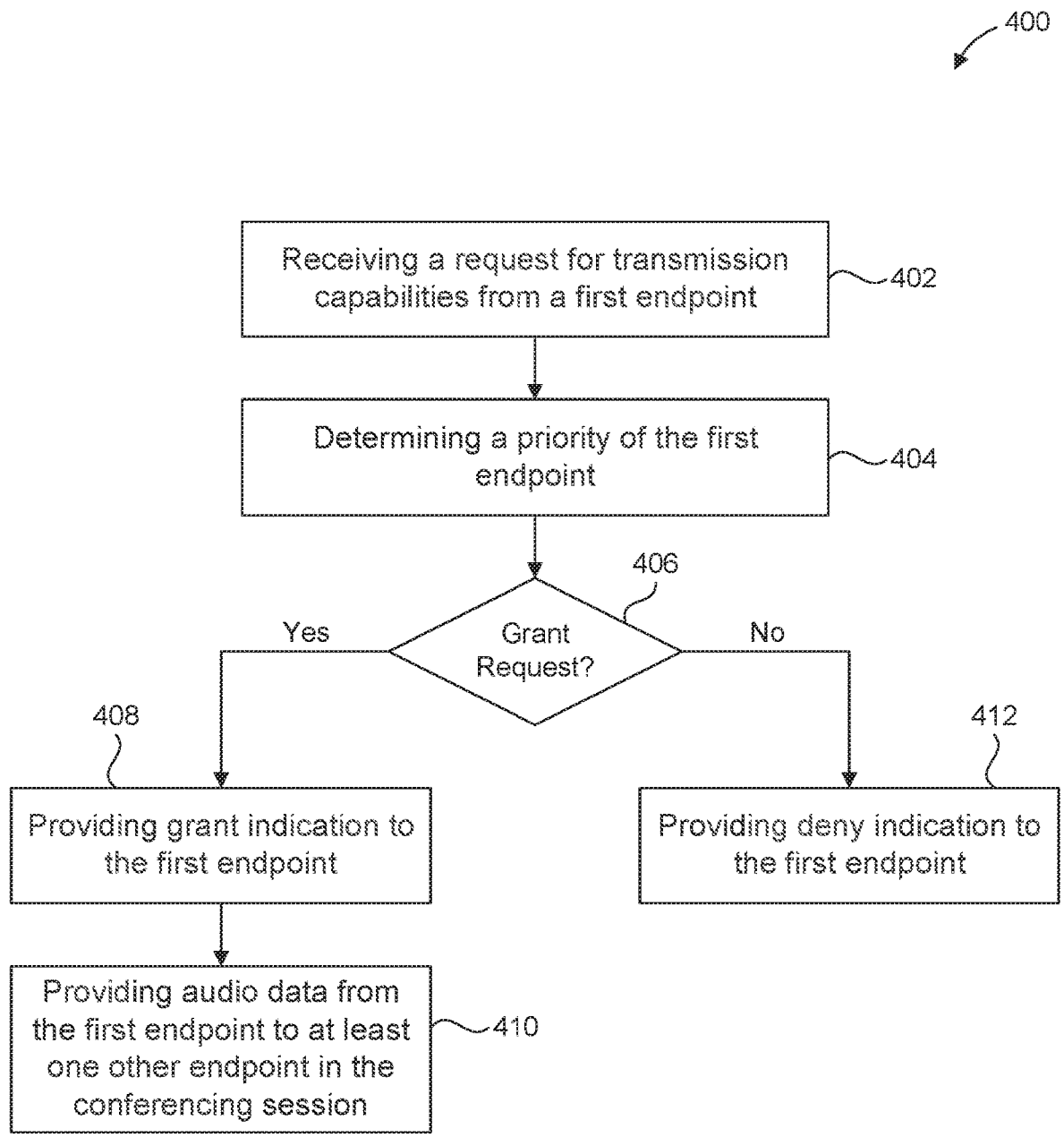
FIG. 4 depicts a flow diagram of an example method of determining whether to grant transmission capabilities to a requesting endpoint according to example aspects of the present disclosure.

FIG. 4 depicts a flow diagram of an example method (400) of determining whether to grant transmission capabilities to a requesting endpoint according to example aspects of the present disclosure. The method (400) can be implemented by one or more computing devices, such as one or more of the computing devices depicted in FIG. 6. More particularly, in some implementations, the method (400) can be implemented by one or more of the session controller 210, the radio detector 212, the mode selector 214, and the floor regulator 216 depicted in FIG. 2. In addition, FIG. 4 depicts steps performed in a particular order for purposes of illustration and discussion.

At (402), the method (400) can include receiving a request for transmission capabilities from a first endpoint. The request can be provided while a conferencing session associated with a conferencing system is operating in a PTT mode. The request can be provided during various contexts of the conferencing session. For instance, the request can be provided while the floor is "open" or "closed." Further, the request may be provided along with (e.g. simultaneously or nearly simultaneously) requests from one or more other requesting endpoints, such that a decision must be made as to which requesting endpoint is to be granted transmission capabilities.

At (404), the method (400) can include determining a priority of the first endpoint based at least in part on floor control parameters associated with the conferencing session. In some implementations, the priority of the endpoint can be relative to one or more other endpoints in the conferencing session. For instance, a priority can be determined between the first endpoint and one or more other requesting endpoints. As another example, a priority can be determined between the first endpoint and a currently transmitting endpoint. In instances wherein the first endpoint is the only requesting endpoint while the floor is "open," the first endpoint can be given first priority.

In some implementations, the priority can be dynamically determined responsive to receiving the request for transmission capabilities. In some implementations, the priority can be predetermined. For instance, the priority can be determined between each of the endpoints of the conferencing session, and the predetermined priority can be accessed responsive to receiving a request for transmission capabilities to determine whether to grant or deny the request. In some implementations, the predetermined priority can be updated to reflect changing contexts or circumstances. For instance, as indicated above, such contexts or circumstances can be specified in the floor control parameter data, and the priorities can be updated based on the floor control parameter data. In some implementations, the priority may be manually input by a user.

At (406), the method (400) can include determining whether to grant or deny the request from the first endpoint. As indicated, the determination may be made based at least in part on the priority and/or the floor control parameters. In some implementations, the request can be denied unless there is an "open floor," such that a requesting endpoint cannot interrupt a currently transmitting endpoint. For instance, in such implementations, the priority of (404) can be determined, such that a requesting endpoint will not have a higher priority that a currently transmitting endpoint.

If transmission capabilities are granted to the first endpoint, at (408), the method (400) can include providing a grant indication to the first endpoint. The grant indication can be any suitable message informing the first endpoint that it has received transmission capabilities.

At (410), the method (400) can include providing audio data from the first endpoint to at least one other endpoint in the conferencing session. As indicated, the audio data may be provided by the first endpoint along with the request for transmission capabilities, or the audio data may be sent separately from the request. In some implementations, the audio data can be provided to each endpoint in the conferencing session. In some implementations, the audio data can be sent to a subset of the endpoints. For instance, the first endpoint may specify one or more destination endpoints to which the audio data is to be sent.

Returning to (406), if transmission capabilities are denied, at (412), the method (400) can include providing a deny indication to the first endpoint. Similar to the grant indication in (408), the deny indication can be any suitable message informing the first endpoint that transmission capabilities have been denied.

Figure 5:
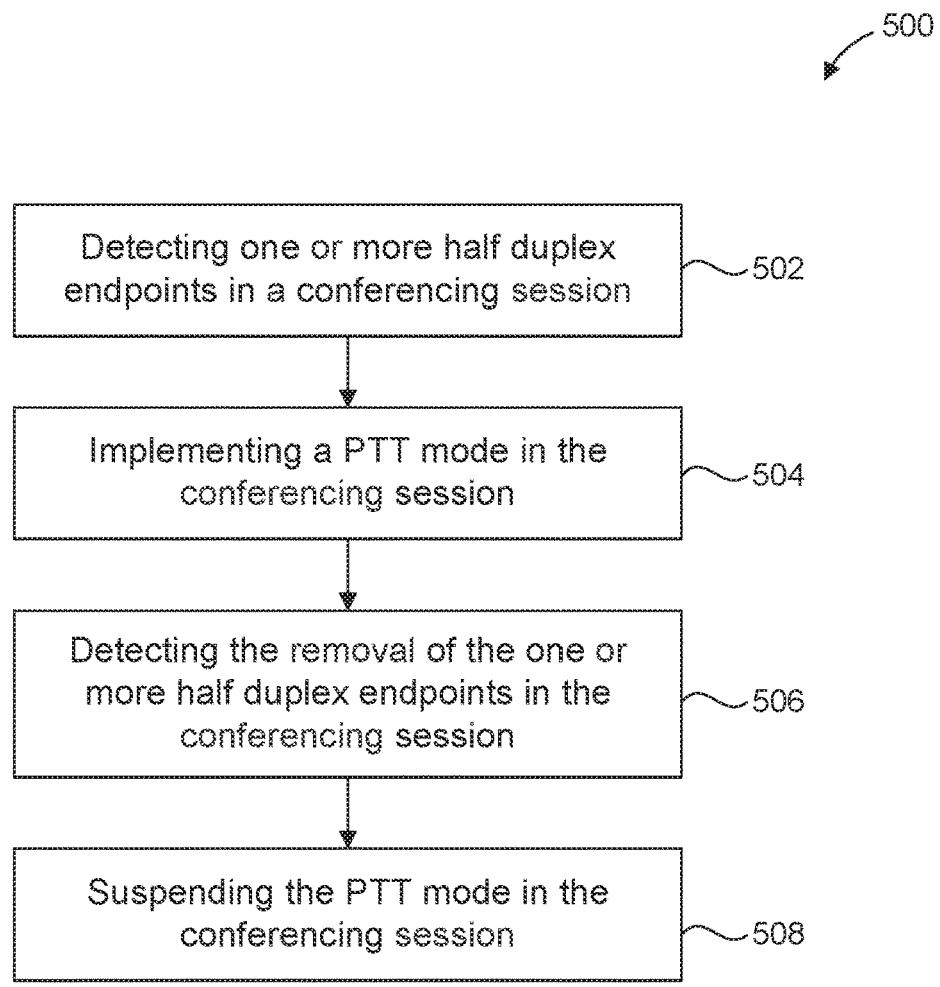
FIG. 5 depicts a flow diagram of an example method of implementing PTT communication techniques in a multimedia conferencing system according to example aspects of the present disclosure.

FIG. 5 depicts a flow diagram of an example method (500) of implementing a PTT mode responsive to a detection of one or more radio endpoints. The method (500) can be implemented by one or more computing devices, such as one or more of the computing devices depicted in FIG. 6. More particularly, in some implementations, the method (500) can be implemented by one or more of the session controller 210, the radio detector 212, the mode selector 214, and the floor regulator 216 depicted in FIG. 2. In addition, FIG. 5 depicts steps performed in a particular order for purposes of illustration and discussion.

At (502), the method (500) can include detecting one or more half duplex endpoints (e.g. radio endpoints) in the conferencing session operating using half duplex or simplex communication techniques. The one or more half duplex endpoints can be detected using any suitable technique. For instance, in some implementations, upon joining the conferencing session, a radio system may provide an a radio resource presence message to the conferencing platform indicative of the presence of the radio system in the conferencing system. Such message can include identifying data of one or more endpoints, a radio gateway, and/or other component associated with the radio system. The message may be sent by the radio gateway, a radio endpoint, and/or other suitable component.

At (504), the method (500) can include implementing a PTT mode in the conferencing session. In some implementations, the PTT mode can be implemented responsive to detecting the one or more half duplex endpoints. Implementing the PTT mode can include suspending operation of a continuous communication mode or other communication mode in which the conferencing session is currently operating. As indicated above, the PTT mode can impose a floor control wherein only one endpoint is granted transmission capabilities at a given time.

At (506), the method (500) can include detecting the removal of the one or more half duplex endpoints in the conferencing session. The removal can be detected using any suitable technique. For instance, in some implementations, prior to leaving the conferencing session, the radio system may provide an indication to the conferencing platform informing the conferencing platform of the removal.

At (508), the method (500) can include suspending operation of the PTT mode in the conferencing session. In some implementations, the PTT mode can be suspended responsive to detecting the removal of the one or more half duplex endpoints. Upon suspending operation of the PTT mode, the continuous mode can be reinstated.

Figure 6:
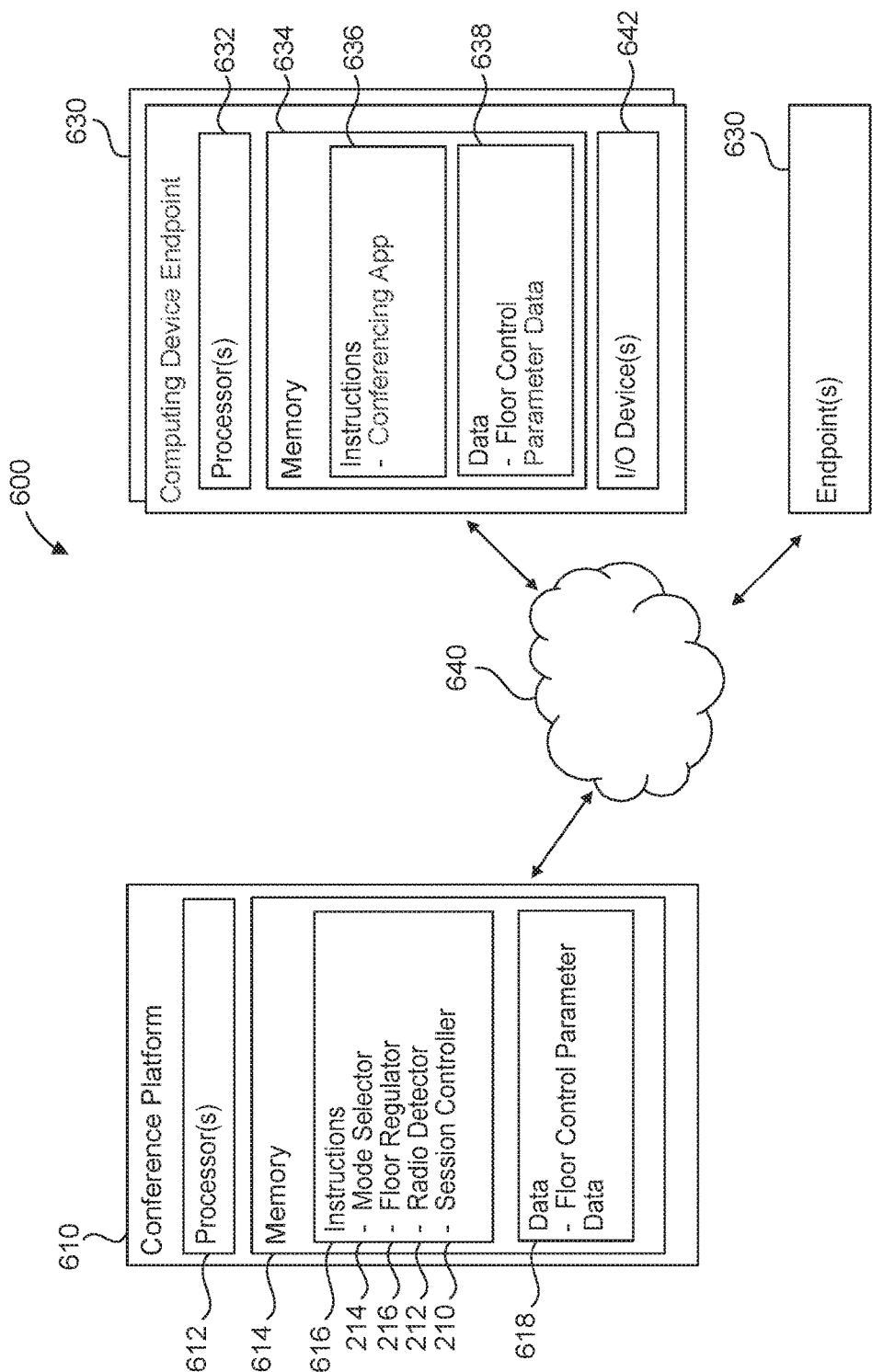
FIG. 6 depicts an example system according to example aspects of the present disclosure.

FIG. 6 depicts a interoperable multimedia conferencing system 600 that can be used to implement the methods and systems according to example aspects of the present disclosure. The system 600 can be implemented using a client-server architecture that includes a conferencing platform 610 that communicates with one or more computing device endpoints 630 over a network 640. The system 600 can be implemented using other suitable architectures. For instance, the system 600 can include one or more conferencing hubs to relay data between one or more endpoints and the conferencing platform. As another example, the system 600 can be implemented as a peer-to-peer system, wherein one or more functions performed by the conferencing platform 610 are performed by one or more endpoints.

The system 600 includes a conferencing platform 610. The conferencing platform 610 can be, or can be hosted by, a server. The conferencing platform 610 can be implemented using any suitable computing device(s). The conferencing platform 610 can have one or more processors 612 and memory 614. The conferencing platform 610 can also include a network interface used to communicate with one or more endpoints, such as computing device endpoints 630, over the network 640. The network interface can include any suitable components for interfacing with one more networks, including for example, transmitters, receivers, ports, controllers, antennas, or other suitable components.

The one or more processors 612 can include any suitable processing device, such as a microprocessor, microcontroller, integrated circuit, logic device, or other suitable processing device. The memory 614 can include any one or more computer-readable media, including, but not limited to, non-transitory computer-readable media, RAM, ROM, hard drives, flash drives, or other memory devices. The memory 614 can store information accessible by the one or more processors 612, including computer-readable instructions 616 that can be executed by the one or more processors 612. The instructions 316 can be any set of instructions that when executed by the one or more processors 612, cause the one or more processors 612 to perform operations. For instance, the instructions 616 can be executed by the one or more processors 612 to implement the session controller 210, radio detector 212, mode selector 214, and/or floor regulator 216, and/or various aspects of any of the methods or systems disclosed herein.

It will be appreciated that the session controller 210, radio detector 212, mode selector 214, and/or floor regulator 216, and/or various aspects of any of the methods or systems disclosed herein can be implemented using computer logic to provide desired functionality. Thus, such components can be implemented in hardware, application specific circuits, firmware and/or software controlling a general purpose processor. In one embodiment, the components can be program code files stored on the storage device, loaded into memory and executed by a processor or can be provided from computer program products, for example computer executable instructions, that are stored in a tangible computer-readable storage medium such as RAM, hard disk or, optical or magnetic media. When software is used, any suitable programming language or platform can be used to implement the component.

Memory 614 can also include data 618 that can be retrieved, manipulated, created, or stored by the one or more processors 612. The data 618 can include, for instance, floor control parameter data, and other data. The data 618 can be stored in one or more databases. The one or more databases can be connected to the conferencing platform 610, for instance, by a high bandwidth LAN or WAN, or can also be connected to conferencing platform 610 through network 640. The one or more databases can be split up so that they are located in multiple locales.

The conferencing platform 610 can exchange data (e.g. audio data and/or video data) with one or more computing device endpoints 630 over the network 640. More particularly, the conferencing platform can receive data from one or more endpoints and relay or distribute the received data to one or more other endpoints associated with the conferencing system. Although two computing device endpoints 630 are illustrated in FIG. 6, any number of computing device endpoints 630 can be connected to the conferencing platform 610 over the network 640. Each of the computing device endpoints 630 can be any suitable type of computing device, such as a general purpose computer, special purpose computer, laptop, desktop, mobile device, smartphone, tablet, wearable computing device, a display with one or more processors, or other suitable computing device. The conferencing platform 610 can further exchange data with one or more other endpoints 620. The endpoints 620 can include one or more telephone devices (e.g. land line telephones or mobile telephones), two-way radio devices, and/or other suitable endpoints as described herein.

Similar to the conferencing platform 610, a computing device endpoint 630 can include one or more processor(s) 632 and a memory 634. The one or more processor(s) 632 can include one or more central processing units (CPUs), graphics processing units (GPUs) dedicated to efficiently rendering images, and/or other processing devices. The memory 634 can include one or more computer-readable media and can store information accessible by the one or more processors 632, including instructions 636 that can be executed by the one or more processors 632 and data 638. For instance, the memory 634 can store instructions 636 for implementing a conferencing application to a user. The conferencing application can be associated with the conferencing system 600, and can be used to facilitate communication between a plurality of endpoints. In some implementations, the memory can store instructions 636 for implementing one or more of the session controller 210, radio detector 212, mode selector 214, and/or floor regulator 216, and/or various aspects of any of the methods or systems disclosed herein. For instance, such implementations may be instead of or in addition to those performed by the conferencing platform 610.

The computing device endpoint 630 of FIG. 6 can include various input/output devices 642 for providing and receiving information from a user, such as a touch screen, touch pad, data entry keys, speakers, and/or a microphone suitable for voice recognition. For instance, the computing device endpoint 630 can have one or more camera devices, and/or microphone devices for capturing audio and/or video data to be communicated to one or more endpoints in the conferencing system.

The computing device endpoint 630 can also include a network interface used to communicate with one or more remote computing devices (e.g. conferencing platform 610) over the network 640. The network interface can include any suitable components for interfacing with one more networks, including for example, transmitters, receivers, ports, controllers, antennas, or other suitable components.

The network 640 can be any type of communications network, such as a local area network (e.g. intranet), wide area network (e.g. Internet), cellular network, or some combination thereof. In this manner, the network 640 can correspond to one or more of the networks, gateways, etc. depicted in FIG. 1. The network 640 can also include a direct connection between a computing device endpoint 630 and the conferencing platform 610. In general, communication between the conferencing platform 610 and a computing device endpoint 630 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

Various embodiments may also include additional capability as discussed below. For example, various embodiments may also include a voice operated switch (known as VOX) or voice activity detection (VAD) module coupled to a conference endpoint or conference hub whereby human voice inputs of the user of the conference endpoint when detected by the VOX or VAD module as a human voice input is interpreted as a transmit request or transmit command event and is sent to the floor control module which grants the request.

In various embodiments, a radio connection detection module (RCD) may correspond to radio detector 212 depicted in FIG. 2 and described in the associated text. A radio connection detection module (RCD) may be present such that in any conference, if a two-way radio communications device or PTT application (a PTT member) is detected as a member of a conference, the transmission mode of operation of the conference may be changed from a default duplex audio or audiovisual mode among endpoints to a PTT mode by sending a message to a software program module coupled to the floor control function or conference hub that determines the transmission mode of operation of a conference at the time of session initiation or at any time during the duration of the session.

In certain embodiments, the RCD may be a software program module coupled to a floor control function or conference hub application server or any one or more conference applications that receive a PTT member presence message from a two-way radio communications device that requests to join, is invited to join, or joins a conference, or from the host other network upon which the PTT member operates, including via a PTT member network switch or server or message gateway, a radio or mobile push to talk interoperability gateway, inter RF subsystem interface, console subsystem interface or other system to system message or information exchange interface which is connected, directly or indirectly, to the conference or software application module coupled to the conference.

In certain embodiments, the radio resource presence message may be a radio unit identification, a radio channel identification, a talk group identification, radio gateway identification or other information signal sent or transmitted from any one of them, where the message may be sent from its source without any request from a recipient or may be sent in response to a request by a recipient.

In certain embodiments, the radio resource presence message may be inferred from the radio frequency transmission, a message encoding scheme, an encryption scheme, an encryption certificate or key identity, either itself or in conjunction with any external information reference such as a directory database, registry, or certificate authority.

In certain embodiments, the RCD may automatically trigger a change in transmission mode of operation by sending a notification or command to the floor control function or other control management module coupled to the conference hub, or a conference endpoint upon receiving a notification or command message from an RCD may change the transmission mode of operation through a GUI control invocation by the user. In various embodiments, GUI control may correspond to a GUI of conferencing application 220 depicted in FIG. 2 and described in the associated text.

In certain embodiments, upon the changing of a conference transmission mode of operation from a duplex mode to a PTT mode, there may be an audio or visual message which is transmitted to conference endpoints indicating a change in mode that is visually displayed and/or may be played as an audio output signifying a change in transmission mode. There may be an audio instruction message that is sent to telephonic or other communications device endpoints having neither a graphical user interface or mechanical PTT control with an operating instruction on transmitting voice via a specified dual-tone multi-frequency (DTMF) signaling command or utilizing a muting function as available with such communications device.

For a conference application, the microphone or audio GUI control may change a display or reveal, or be substituted by or supplemented with, a PTT GUI control whereby a user may invoke a PTT control transmit function to transmit or request to transmit audio from the conference endpoint into the conference until the conference transmission mode changes to a full duplex mode.

The conference application GUI may visually display the presence of two-way radio communications device or a PTT application as a member conference endpoint in a conference by means of a graphical representation or other visually displayable information in a conference application GUI. The conference application GUI may identify or symbolize the conference endpoint as a two-way radio or PTT application member conference endpoint, which may be substituted for a source video stream associated with the two-way radio communications device or PTT application, where the graphical representation may include: (a) any predesignated graphical icon or avatar being in a readable file image format; (b) a base geographic map image with the location of the two-way radio client being updated in real or near real time from location message data sent from the two-way radio, the radio network, radio gateway or other system associated with the radio network; (c) the name or identity of the two-way radio client as transmitted from the two-way radio client, radio network or the radio gateway, including any identification information embedded in the radio message format or which may be transcoded or translated by a server or application to a message format readable by the conference hub or conference application; or (d) a Web page, HTML, XML or other formatted file or data format that may be called by the conference hub or conference application conference application, and/or may be rendered, parsed, relayed or redistributed, including social network profiles which may associated with a conference application user or other conference endpoint client, or user's identity.

In certain embodiments, a text based name or identity and/or associated image file may be input by another conference application or user with administrative write or posting privileges through a conference application or administrative software module interface coupled to a conference hub that is then sent or distributed to other conference application clients or may be accessed by other conference application clients.

In certain embodiments, a video camera source may be associated with a two-way radio communications device or PTT application such that the video stream from the associated camera source may transmitted to a conference hub and associated with the identity of the conference endpoint, where the associated video source may be relayed, or transcoded and relayed, retransmitted, rebroadcast, or distributed to conference application clients and the displayed video content associated with the two-way radio communications device. The association may be graphic, text or other visual or audio attribution which may be displayed or played in a conference application or other conference endpoint, where the association of source video may be determined by: (a) shared or relational identifier, such as the two-radio user ID and/or camera source ID which is transmitted to the conference hub or conference applications; (b) proximity to a source video based on relative location to the two-way radio, where the two-way radio location and video camera location are known; (c) a database or other data structure whereby video camera sources are associated with the identity of an endpoint, or vice versa.

There may be a video availability module (VAM) which is coupled to the conference hub or conference application where the location of the two-way radio communications device or PTT application is received and the VAM may activate a relevant camera and connect or cause an agent to connect to the video camera output and cause the video camera output to be transmitted to the conference hub or conference applications for display associated with or attributed to the two-way radio communications device or PTT application.

There may be a voice activated control (VAC) module coupled to the conference hub or conference client whereby a two-way radio user may transmit pre-established phrases or key words to a voice interpreter module that activates a command control state whereby the two-way radio communications device or PTT application may transmit voice commands to the agent to perform conference endpoint functions in the conference, including to: (a) transmit a video source into the conference from an associated video camera and to stop transmitting video into the conference; (b) mute, stop, block, or allow all audio messages being received into the connected radio network channel or separate communications session through which the two-way radio communications device or PTT application is connected or joined as a member conference endpoint; (c) send a barge-in command whereby the floor control function or audio transmit block function upon receiving the command grants transmit audio authority to the communications device or PTT application and interrupts a previously granted transmission authority in effect, or stops or blocks the transmission of audio messages in progress from being transmitted, relayed, broadcast or distributed to other conference endpoints; (d) send an alarm or other priority message; (e) activate voice to text functions such that all voice transmitted by the communications device or PTT application is sent to a voice to text module, and voice to text module sends text messages to the conference hub or conference application clients or other endpoint clients capable of receiving text messages; and (f) activate a text to voice function such that all text messages transmitted in the conference are translated to voice and transmitted to two-way radios participants.

When a communications device or PTT application is connected to a conference, there may be an audio transmit block function (TBF), which may be a module coupled to or part of the floor control function that blocks, suppresses, or mutes, or isolates audio messages transmitted by other conference endpoints and creates an open transmit floor audio interval to enable a two-way radio to seek to transmit to a conference session, which may include: (a) an audio spooling and delayed audio stream transmit function for audio messages sent to enable transmit requests from two-way radio units connected to the conferencing session, or (b) a separate control channel message sent from the communications device or PTT application or the two-way radio network or separate communications network seeking transmit authority which is received by floor control function and activates a transmit block function, or (c) a separate conference voice channel which is comprised of duplex audio enabled conference endpoints that may transmit and exchange audio without floor control function governance or control which is the coupled with separate and distinct audio communications session between the two-way radio, radio interoperability gateway or radio network whereby two-way radio audio is transmitted to the conference hub or a receiver which relays the transmitted audio in near real time to the other conference voice channel and receives audio transmission from the other session comprised of conferencing endpoints that is subject to the transmit block function (TBF), where in each case the audio spooling and delayed transmission function may be actuated by a programmatic algorithm which employs a predetermined frequency pattern, a statistical pattern of floor availability based on push to talk transmit frequency and associated audio message length, and other parameters and rules taking in to account transmit priority.

There may be one or more agents which may be programmatic modules or remotely connected services whereby an agent may be invited to join or joins as a identified conference endpoint, or is otherwise announced or displayed as being present to other conference endpoints. In embodiments, an agent may: (a) receive audio messages, video, text messages, files or other information from the conference hub or other conference endpoints, and/or (b) transmit or send audio messages, video, text messages, files or other information to other conference endpoints, and/or (c) execute functions or tasks requested or directed by a conference endpoint or conference hub, and/or (d) send audio messages, video, text messages, files or other information to other conference endpoints as described above, including: providing audio information messages on periodic basis, including alerts, warnings, status readings, reminders, instructions, and commands, for any matter of interest, including information about weather conditions, environmental conditions, presence of persons or objects of interest, the presence of chemical, biological, radiological, nuclear or other substances of interest, electromagnetic, radiation, proximity of any person or thing of interest to another object or thing of interest or a location, speed, acceleration, change or presence of a force, occurrence of an event of interest.

Also included in embodiments are performing automated tasks using information received from a conference hub or conference endpoint either alone or in combination with any information or services external to the conference which the agent may query or access, including: (a) performing requested or pre-determined video analytic functions upon video received from a conference hub or conference endpoint, including text or number, object, symbol, facial, movement, gesture, or behavioral recognition and sending desired or specified function output to a conference endpoint in a video, image, text, message or other readable format; (b) performing requested or pre-determined audio analytic functions upon audio received from a conference hub or conference endpoint, including voice matching analysis, voice stress analysis, or sound recognition, voice transcription or voice translation, language recognition, speech pattern recognition, and sending desired or specified function output to a conference endpoint in a video, image, text, message or other readable format; (c) performing web search utilizing input or predetermined search criteria; (d) performing a telephone call or sending conference invitation to a non-conference member entity; (e) sending a text message, email message, or alert to a non-conference member entity; (f) sending a control function command via the agent to any system to which the agent is connected or may interface and connect, including sending a disarm, lock or unlock, on, off, change state or mode, or other command; (g) recording a conference session, including audio transmissions, video, files and other information sent or transmitted in the conference, where (i) a conference endpoint may mark or insert metatags or other digital associations with content in time which are unique to the endpoint and may be shared or not shared with other endpoints, where markers or tags may be keywords, descriptors, codes, or symbols representing content, subjects or events of interest; and (ii) the markers or tags created by a conference endpoint may be searched by search criteria input by a user of a conference endpoint, and the video frames, audio content or other associated information may be called and replayed or viewed.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of implementing floor control in a conferencing session, the method comprising:

receiving, by one or more computing devices, a radio resource presence message from a radio gateway, the radio resource presence message indicating an entry of one or more radio endpoints into the conferencing session, wherein the one or more radio endpoints communicate using only half-duplex communication techniques, and are incapable of communicating using full-duplex communication techniques, wherein the conferencing session is associated with a conferencing system comprising a plurality of endpoints, and wherein at least one of the endpoints in the conferencing system is a full-duplex endpoint capable of communicating in the conferencing session using full-duplex communication techniques, and wherein the radio resource presence message is received while the conferencing session is operating in a full-duplex mode wherein each endpoint is communicating in the conferencing session using full-duplex communication techniques;

in response to receiving the radio resource presence message, switching, by the one or more computing devices, the conferencing session from the full-duplex mode to a push-to-talk mode;

receiving, by the one or more computing devices, a transmission capabilities request from a first endpoint of the conferencing session;

granting, by the one or more computing devices, transmission capabilities to the first endpoint based at least in part on one or more floor control parameters associated with the conferencing session; and subsequent to granting transmission capabilities to the first endpoint, providing, by the one or more computing devices, audio data from the first endpoint to at least one endpoint of the plurality of endpoints.

2. The computer-implemented method of claim 1, further comprising:
detecting, by the one or more computing devices, a removal from the conferencing session of the one or more endpoints that are incapable of communicating in the conferencing session using full-duplex communication techniques; and
responsive to detecting the removal of the one or more endpoints that are incapable of communicating in the conferencing session using full-duplex communication techniques, suspending, by the one or more computing devices, the push-to-talk mode.

3. The computer-implemented method of claim 1, further comprising, responsive to receiving the transmission capabilities request from the first endpoint, determining, by the one or more computing devices, whether to grant transmission capabilities to the first endpoint based at least in part on the one or more floor control parameters.

4. The computer-implemented method of claim 1, further comprising:
receiving, by the one or more computing devices, a transmission capabilities request from a second endpoint; and
determining, by the one or more computing devices, whether to grant transmission capabilities to the second endpoint based at least in part on the one or more floor control parameters.

5. The computer-implemented method of claim 4, further comprising:
revoking, by the one or more computing devices, transmission capabilities from the first endpoint; and
granting, by the one or more computing devices, transmission capabilities to the second endpoint.

6. The computer-implemented method of claim 4, further comprising denying, by the one or more computing devices, transmission capabilities to the second endpoint.

7. The computer-implemented method of claim 1, wherein the transmission capabilities request comprises a request to transmit the audio data.

8. The computer-implemented method of claim 1, wherein the one or more floor control parameters comprise at least one of a current floor allocation, an order or timing of transmission capabilities requests, identifying data associated with one or more endpoints in the conferencing session, relative ranks associated with the one or more endpoints in the conferencing session, contextual information asserted by one or more endpoints in the conferencing session, relative importance of one or more endpoints in the conferencing session, endpoint types of one or more endpoints in the conferencing session, or respective locations of one or more endpoints in the conferencing session.

9. The computer-implemented method of claim 1, further comprising:
responsive to granting transmission capabilities to the first endpoint, providing, by the one or more computing devices, a transmission capabilities grant message to the first endpoint.

10. The computer-implemented method of claim 1, further comprising:
subsequent to granting transmission capabilities to the first endpoint, receiving, by the one or more computing devices, a transmission capabilities request from a second endpoint; and
denying, by the one or more computing devices, the transmission capabilities request.

11. The computer-implemented method of claim 1, wherein switching the conferencing session from the full-duplex mode to the push-to-talk mode comprises implementing, by the one or more computing devices, a floor control within the conferencing session.

12. A computing system comprising:
one or more processors;
one or more memory devices, the one or more memory devices storing computer-readable instructions that when executed by the one or more processors cause the one or more processors to perform operations, the operations comprising:
receiving a radio resource presence message from a radio gateway, the radio resource presence message indicating an entry of one or more endpoints into the conferencing session, wherein the one or more radio endpoints communicate using only half-duplex communication techniques, and are incapable of communicating using full-duplex communication techniques, wherein the conferencing session is associated with a conferencing system comprising a plurality of endpoints, and wherein at least one of the endpoints in the conferencing session is a full-duplex endpoint capable of communicating in the conferencing session using full-duplex communication techniques, and wherein the radio resource presence message is received while the conferencing session is operating in a full-duplex mode wherein each endpoint is communicating in the conferencing session using full-duplex communication techniques;
in response to receiving the radio resource presence message, switching the conferencing session from the full-duplex mode to a push-to-talk mode;
receiving a transmission capabilities request from a first endpoint of the conferencing session;
granting transmission capabilities to the first endpoint based at least in part on one or more floor control parameters associated with the conferencing session; and
subsequent to granting transmission capabilities to the first endpoint, providing audio data from the first endpoint to at least one endpoint of the plurality of endpoints.

13. The computing system of claim 12, the operations further comprising:
detecting a removal from the conferencing session of the one or more endpoints that are incapable of communicating in the conferencing session using full-duplex communication techniques; and
responsive to detecting the removal of the one or more endpoints that are incapable of communicating in the conferencing session using full-duplex communication techniques, suspending the push-to-talk mode.

14. One or more tangible, non-transitory computer-readable media storing computer-readable instructions that when executed by one or more processors cause the one or more processors to perform operations, the operations comprising:
receiving a radio resource presence message from a radio gateway, the radio resource presence message indicating an entry of one or more endpoints into the conferencing session, wherein the one or more radio endpoints communicate using only half-duplex communication techniques, and are incapable of communicating using full-duplex communication techniques, wherein the conferencing session is associated with a conferencing system comprising a plurality of endpoints, and wherein at least one of the endpoints in the conferencing session is a full-duplex endpoint capable of communicating in the conferencing session using full-duplex communication techniques, and wherein the radio resource presence message is received while the conferencing session is operating in a full-duplex mode wherein each endpoint is communicating in the conferencing session using full-duplex communication techniques;

in response to receiving the radio resource presence message, switching the conferencing session from the full-duplex mode to a push-to-talk mode;

receiving a transmission capabilities request from a first endpoint of the conferencing session;

granting transmission capabilities to the first endpoint based at least in part on one or more floor control parameters associated with the conferencing session; and subsequent to granting transmission capabilities to the first endpoint, providing audio data from the first endpoint to at least one endpoint of the plurality of endpoints.

\* \* \* \* \*